(12) United States Patent
Dattatri et al.

(10) Patent No.: US 10,732,957 B2
(45) Date of Patent: Aug. 4, 2020

(54) DETERMINING A STABILITY INDEX ASSOCIATED WITH A SOFTWARE UPDATE

(71) Applicant: Dell Products L. P., Round Rock, TX (US)

(72) Inventors: Maheshwar Dattatri, Cedar Park, TX (US); Nikhil M. Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 16/048,729

(22) Filed: Jul. 30, 2018

(65) Prior Publication Data

US 2020/0034133 A1      Jan. 30, 2020

(51) Int. Cl.
| | |
|---|---|
| *G06F 8/65* | (2018.01) |
| *H04L 12/26* | (2006.01) |
| *H04L 29/06* | (2006.01) |
| *H04L 12/24* | (2006.01) |
| *G06F 9/4401* | (2018.01) |
| *H04W 4/70* | (2018.01) |

(52) U.S. Cl.
CPC ............ *G06F 8/65* (2013.01); *H04L 43/0817* (2013.01); *G06F 9/4413* (2013.01); *H04L 29/06* (2013.01); *H04L 41/0873* (2013.01); *H04L 63/166* (2013.01); *H04W 4/70* (2018.02)

(58) Field of Classification Search
CPC ... G06F 8/65; G06F 8/61; G06F 8/654; G06F 9/4413; H04L 29/06; H04L 41/0206; H04L 41/0233; H04L 41/069; H04L 41/082; H04L 41/0873; H04L 43/0817; H04L 43/16; H04L 63/166; H04L 67/12; H04L 67/34; H04W 4/70
USPC ........................................................ 717/173
See application file for complete search history.

(56) References Cited

U.S. PATENT DOCUMENTS

| | | | |
|---|---|---|---|
| 2012/0246632 A1* | 9/2012 | Lupu et al. ........... | G06F 9/4413 717/173 |
| 2016/0196132 A1* | 7/2016 | Searle et al. .............. | G06F 8/65 717/173 |
| 2017/0034023 A1* | 2/2017 | Nickolov et al. ......... | G06F 8/65 |

\* cited by examiner

*Primary Examiner* — Wei Y Zhen
*Assistant Examiner* — Mohammed N Huda
(74) *Attorney, Agent, or Firm* — Campbell Stephenson LLP; Shiv S. Naimpally

(57) ABSTRACT

In some examples, a server may receive telemetry data from a computing device. The server may determine based at least in part on the telemetry data, (1) a device (e.g., hardware and software) configuration associated with the computing device and (2) one or more events (e.g., an installation log, a memory dump, or the like) associated with installing a software package on the computing device. Based at least in part on the one or more events. the server may determine a stability index associated with the software package and associate the stability index with the device configuration. The stability index may indicate a probability of errors not occurring after the software package is installed. After determining that the stability index satisfies a predetermined threshold, the server may provide the software package and the associated stability index for download to one or more additional computing devices.

20 Claims, 10 Drawing Sheets

200

SOFTWARE PACKAGE VARIABLES (P) 202
P1: PACKAGE TYPE: NATIVE/UNIVERSAL APPLICATION, BIOS, FIRMWARE, DRIVER
P2: PACKAGE SIZE (IN MB)
P3: AVERAGE TIME FOR INSTALLATION
P4: REBOOT REQUIREMENT (YES/NO)
P5: FIRST INSTALL OR UPGRADE
•••
PN: <PACKAGE RELATED VARIABLE>

OTA DEPLOYMENT VARIABLES (O) 204
O1: GEOGRAPHIC REGION IN WHICH SOFTWARE UPDATE WILL BE MADE AVAILABLE
O2: NUMBER OF DISTINCT PLATFORMS
O3: NUMBER OF OPERATING SYSTEMS
•••
OM: <DEPLOYMENT RELATED VARIABLE>

DEPLOYMENT TIMING VARIABLES (T) 206
T1: DAY OF THE WEEK (E.G., WEEKDAY VS. WEEKEND)
T2: TIME OF DAY (E.G., MORNING, AFTERNOON, EVENING)
T3: MONTH
T4: SEASON
•••
TQ: <TIMING RELATED VARIABLE>

DEVELOPMENT VARIABLES (D) 208
D1: PROVIDER (E.G., INTERNAL TEAM, VENDOR, ...)
D2: TEAM/DEPARTMENT
D3: LEAD DEVELOPER
D4: ARCHITECT
•••
DR: <DEVELOPMENT RELATED VARIABLE>

VALIDATION VARIABLES (P) 210
V1: VALIDATION (E.G., INTERNAL, ODM, VENDOR, ...)
V2: VALIDATION TEAM
V3: VALIDATION MANAGER
V4: NUMBER OF UNIQUE CONFIGURATIONS THAT WERE TESTED
V5: NUMBER OF VALIDATION PASSES BEFORE APPROVAL
•••
VS: <VALIDATION RELATED VARIABLE>

$$S = f(P, O, T, D, V)$$
(Risk Score $S$)

$$X = \begin{bmatrix} P_{11} & P_{21} & \ldots & O_{} & O_{} & \ldots & T_{} & T_{} & \ldots & D_{} & D_{} & \ldots & V_{**} & \ldots & V_{S1} \\ P_{12} & \ldots & & & & & & & & & & & & & \\ P_{13} & \ldots & & & & & & & & & & & & & \\ & \ldots & & & & & & & & & & & & & \\ P_{1N} & \ldots & & & & & & & & & & & & & V_{SN} \end{bmatrix}$$

$$\beta = \begin{bmatrix} \beta_0 \\ \beta_1 \\ \ldots \\ \beta_N \end{bmatrix}$$

FIG. 3

STABILITY INDEX TABLE 146

|  | S/W 826<br>V1.0 | S/W 828<br>V1.1 | S/W 830<br>V2.0 |
|---|---|---|---|
| 1ST PLATFORM 802 |  |  |  |
| CONFIGURATION 810(1) | 99% | 96% | 97% |
| ••• | ••• |  |  |
| CONFIGURATION 810(M) | 97% | 98% | 99% |
| 2ND PLATFORM 804 |  |  |  |
| CONFIGURATION 812(1) | 88% | 98% | 100% |
| ••• | ••• |  |  |
| CONFIGURATION 812(P) | 85% | 100% | 98% |
| 3RD PLATFORM 806 |  |  |  |
| CONFIGURATION 814(1) | 98% | 88% | 99% |
| ••• | ••• |  |  |
| CONFIGURATION 814(Q) | 97% | 81% | 97% |
| ••• |  |  |  |
| NTH PLATFORM 808 |  |  |  |
| CONFIGURATION 816(1) | 100% | 86% | 99% |
| ••• | ••• |  |  |
| CONFIGURATION 816(R) | 99% | 92% | 100% |

FIG. 8

STABILITY INDEX 142 (DETERMINED FOR EACH H/W CONFIGURATION AND FOR EACH S/W VERSION)

$= f ($ TYPE OF EVENT, WEIGHT, NUMBER OF EVENTS, NUMBER OF INSTALLATIONS, SCALING FACTOR
902　　904　　906　　908　　910 $)$

EXAMPLES OF TYPES OF EVENTS: LOG, MEMORY DUMP, APPLICATION CRASH, OPERATING SYSTEM RESTART, BSOD, CUSTOMER CONTACT (E.G., CALL, CHAT, EMAIL, FORUM POST, AND THE LIKE), DEVICE MANAGER YELLOW/QUESTION MARK, AND THE LIKE

FIG. 9

DETERMINING A STABILITY INDEX ASSOCIATED WITH A SOFTWARE UPDATE

BACKGROUND OF THE INVENTION

Field of the Invention

This invention relates generally to computing devices and, more particularly to determining a stability index associated with a software update.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A manufacturer of computing devices, such as desktops, laptops, and tablets, may periodically provide software bundles that are to be installed on computing devices that have been acquired (e.g., purchased or leased) by users. For example, a manufacturer, such as, for example, Dell®, may deliver thousands of software bundles (SWB) each year over the air (OTA) to over 45 million Dell systems. Due to the numerous ways in which computing devices can be configured (e.g., by varying the type of processor, amount of main memory, type of disk drive, size of disk drive, type of graphics card, operating system, and the like), the manufacturer may be unable to test a software update under all possible variations and configurations. Prior to deploying a software update, the manufacturer may perform testing for the most common configurations. The manufacturer may make a software update available and observe the success rate of the software update. If the software update has a relatively high failure rate, the manufacturer may halt deployment of the software update and conduct further tests and verification. If the software update has a relatively high success rate, the manufacturer may continue to deploy the software update. In addition, some types of users, (e.g., gamers and workstation users) may be uninterested in installing a software update when their current computing system (e.g., hardware and software) is stable because the users may not want to risk destabilizing the computing system.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive telemetry data from a computing device. The server may determine based at least in part on the telemetry data, (1) a device (e.g., hardware and software) configuration associated with the computing device and (2) one or more events (e.g., an installation log, a memory dump, or the like) associated with installing a software package on the computing device. Based at least in part on the one or more events, the server may determine a stability index associated with the software package and associate the stability index with the device configuration. The stability index may indicate a probability of errors not occurring after the software package is installed. After determining that the stability index satisfies a predetermined threshold, the server may provide the software package and the associated stability index for download to one or more additional computing devices.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a block diagram illustrating an example of predictor variables used to determine a risk score associated with a software update, according to some embodiments.

FIG. 3 is a block diagram illustrating examples of predictor variables used to train a machine learning algorithm, according to some embodiments.

FIG. 8 is an example of a stability index table, according to some embodiments.

FIG. 9 is an example of a formula to determine a stability index, according to some embodiments.

DETAILED DESCRIPTION

Figure 1:
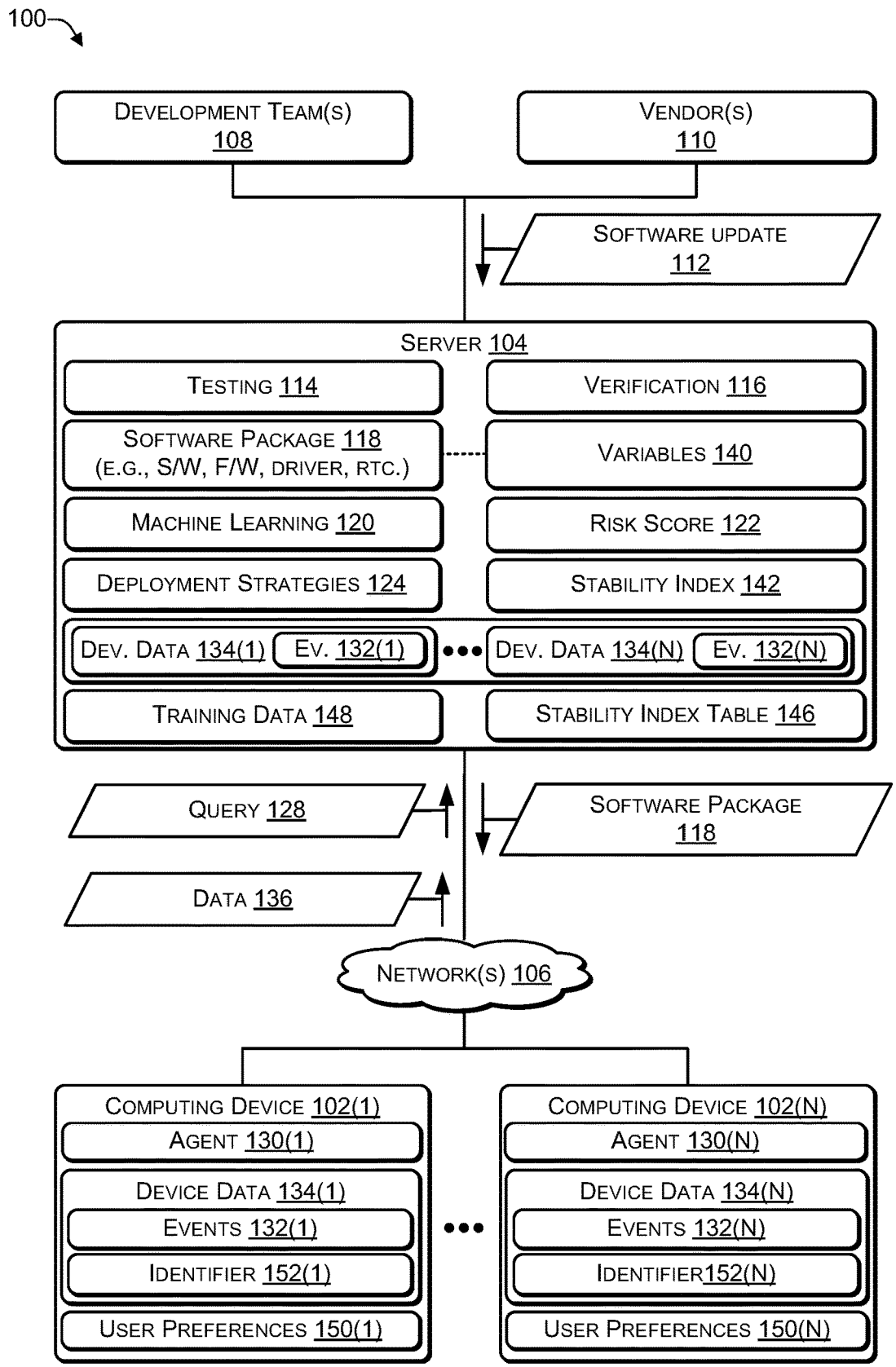
FIG. 1 is a block diagram of a system that includes a server to determine a stability associated with a software update, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein determine a stability index associated with a software update which a computing device can use to determine whether or not to install the software package. For example, a server may receive a software update from a software development team and create a software package that includes additional files (e.g., .NET framework, driver, and the like) used by the software update, for deployment to multiple computing devices. The software update may include an update to (1) a driver associated with a hardware component of a computing device, (2) firmware associated with a hardware component of the computing device, (3) a software application installed on the computing device, (4) a basic input output system (BIOS) of the computing device, or any combination thereof. The server may be used to perform testing, verification, and validation of the software package before the software package is deployed to multiple computing devices.

Each computing device of the multiple computing devices may receive a link to install the software package. A software agent ("agent") installed on each computing device may download and install the software package. The agent may gather events during the installation and after the software package is installed. For example, the events may include one or more logs (e.g., installation log, uninstall log, and the like), a memory dump, an application crash, an operating system restart (e.g., non-user initiated), a stop error or a fatal error (e.g., blue screen of death (BSOD)), customer-initiated contact (e.g., a call to a help line, a chat session with a support staff, an email to support staff, and the like), a yellow color and/or question mark in a Device Manager associated with the operating system, and the like. The agent may gather additional data associated with a corresponding computing device, such as a unique identifier (e.g., service tag, serial number, or the like) that identifies a configuration of the computing device, and other information. The configuration of the computing device may identify a type of processor, a clock speed of the processor, a clock speed of the system bus, a type of the disk drive (e.g., mechanical or solid-state drive (SSD)), a capacity of the disk drive, an amount of main memory, a type of network card, a type of graphics card, an amount of graphics memory, and the like. The configuration of the computing device may identify an operating system (O/S), an O/S version, installed O/S updates, installed drivers and a corresponding version of each driver, installed software application and a corresponding version of each software application, and the like. The agent may send the gathered data, including events and configuration data, to the server. For example, the agent may send the gathered data to the server (1) at predetermined intervals (e.g., every week, every month or the like), (2) in response to a set of events (operating system restarts, application crashes, and the like) occurring within a predetermined time period (e.g., 15 minutes, 30 minutes, or the like), (3) a predetermined period of time (e.g., an hour, 8 hours, 12 hours, 24 hours, or the like) after installing a software package.

The server may receive the gathered data from one or more of the multiple computing devices. The server may use the unique identifier (e.g., serial number, service tag, or the like) from the gathered data to identify a device platform and a configuration associated with the computing device that sent the data. The server may use the events included in the gathered data to determine/update a stability index associated with the software package for the identified device platform and configuration and store the stability index in a stability index table. For example, if the server determines that a software package installed with no errors on multiple Dell® Inspiron 5520 laptops, then the server may determine the stability index to be 100% (e.g., the software package is 100% stable). If the server determines that a software package was installed on one hundred Dell® Inspiron 5520 laptops and two of them encountered major errors, then the server may determine the stability index associated with that particular platform and configuration to be 98%. If the server determines that a software package was installed on one hundred Dell® Inspiron 5520 laptops and twenty of them encountered major errors (e.g., operating system restart, application crash, and the like), then the server may determine the stability index associated with that particular platform and configuration to be 80%.

When a computing device is notified by the server that a software package is available for installation, the computing device may send the computing device's unique identifier to the server. Based on the unique identifier, the server may determine the platform and configuration of the computing device and retrieve the current stability index associated with the software package and configuration from a stability index table. The server may send to the computing device (1) a download link (or other download-related information) for the software package and (2) the corresponding stability index. The computing device may check a user preference file to determine a user preference regarding installing packages. For example, some users, such as early adopters, may specify that a new software package is to be installed regardless of the stability index. Other users, such as more conservative users, may specify that a new software package is to be installed when the stability index is greater than a threshold amount (e.g., at least 90%, at least 95%, at least 98%, or the like). Still other users, who want more control over the computing device, may specify that when a new software package is available, the computing device is to present a user interface displaying information about the software package and the corresponding stability index, and the user may select whether the software package is to be installed and if so, when the software package is to be installed. In addition, some users who are satisfied with the stability of their current software configuration may specify that no software packages are to be installed or that no software packages for a particular component of the computing device are to be installed. For example, a gamer may specify that no new software packages (e.g., drivers) are to be installed for a graphics card. As another example, a workstation user may specify that no new software packages (e.g., software updates) are to be installed for a one or more software applications.

As an example, a server may include one or more processors and one or more non-transitory computer readable media storing instructions executable by the one or more processors to perform various operations. For example, the operations may include receiving telemetry data from a computing device. The operations may include determining, based at least in part on the telemetry data, (1) a device configuration (e.g., a hardware configuration and a software configuration) associated with the computing device and (2) one or more events associated with installing a software package on the computing device. For example, the server may determine, based at least in part on the telemetry data, an identifier associated with the computing device and determine, based at least in part on the identifier, a hardware configuration associated with the computing device. The identifier may comprise a service tag or a serial number. The hardware configuration may include a processor identifier, a processor speed, a graphics processor identifier, an amount of random access memory, a type of a hard drive, and a capacity of the hard drive. The one or more events associated with installing the software package on the computing device may include at least one of: an installation log, a memory dump, a crash associated with the software package, an involuntary restart of an operating system installed on the computing device, a stop error (e.g., blue screen of death (BSOD)), or an indication that a user of the computing device initiated contact (e.g., via a chat, a call, or a social media post) with a support staff member associated with a manufacturer of the computing device. The software package may include at least one of: a driver associated with a hardware component of the computing device; a firmware associated with a hardware component of the computing device; an update to a software application that was previously installed on the computing device; a new software application to be installed on the computing device; or a basic input-output system (BIOS) associated with the computing device. The operations may include determining, a stability index associated with the software package based at least in part on the one or more events and associating the stability index with the device configuration. The stability index may be determined based at least in part on: a type of each event of the one or more events, a weight assigned to each type of event, a number of events that have occurred, a number of times the software package was installed, and a scaling factor. The stability index may indicate a probability that an error does not occur after the software package is installed on an additional computing device having a similar device configuration to the device configuration associated with the computing device. The operations may include determining, that the stability index satisfies a predetermined threshold and providing the software package and the associated stability index for download to one or more additional computing devices. The operations may include receiving second telemetry data from a second computing device, determining that the second computing device has the same device configuration as the computing device, and determining, from the second telemetry data, one or more additional events associated with installing the software package on the second computing device. The operations may include recalculating the stability index associated with the software package based at least in part on the one or more additional events to create an updated stability index and associating the updated stability index with the device configuration. The operations may include determining that the updated stability index fails to satisfy the predetermined threshold and stopping providing the software package for download.

FIG. 1 is a block diagram of a system 100 that includes a server to determine a risk score associated with a software update prior to deploying the software update, according to some embodiments. FIG. 1 includes multiple computing devices 102 (1) to 102 (N) coupled to a server 104 via one or more networks 106.

One or more development teams 108 or one or more external vendor(s) 110 may provide a software update 112 to the server 104. For example, the development team 108 may include a software development team is associated with the manufacturer of the computing devices 102. The development teams 108 may be considered internal development teams as they are internal to the manufacturer of the computing devices 102. The vendors 110 may include vendors external to the manufacturer that provide hardware, firmware, software, drivers or any combination thereof to the manufacturer of the computing devices 102. For example, the vendors 110 may include vendors that central processing units (CPUs), graphic cards, wireless adapter cards, and other chip and device vendors that supply components to the manufacturer of the computing devices 102. The software update 112 may include a software application update, a software patch, a firmware update (e.g., of a hardware component), a driver, a BIOS, or any combination thereof.

After the server 104 receives the software update 112, the software update 112 may undergo testing 114 and verification 116. The testing 114 may be performed to determine that the software update 112 does not have any bugs and does not cause any unexpected issues or problems. The verification 116 may be performed to determine that the software update 112 addresses the issues that it is designed to address or adds the features that it is designed to provide. In some cases, after the testing 114 and the verification 116, the software update 112 maybe modified. For example, the software update 112 may repeatedly undergo testing 114, verification 116 and modification until no bugs or errors are found, e.g., the software update 112 has been verified to provide the features that the update is designed to provide and to address the issues that the update is designed to address.

After the software update 112 has passed the testing 114 and the verification 116, the server 104 may create a software package 118 based on the software update 112. For example, the software package 118 may be a compressed format of the software update 112 and may include any additional software (e.g., .NET framework, a driver, and the like) that is used by the software update 112.

The server 104 may use a machine learning module 120 to determine a risk score 122 associated with the software package 118. For example, the machine learning module 120 may use Random Forest or a similar machine learning model. The machine learning module 120 may be trained using training data 148. The model is trained in a supervised learning framework where the variables for software bundle learn the weights from previous success rates. A supervised machine learning model, can be used, such as tree-based models (e.g., bagging, boosting and its variants. and random forest. Other models that can be used include instance-based models, such as, for example, K-nearest neighbors, self-organizing maps, and the like. Regression-based models such as logistic regression and support vector machines or artificial neural networks such as multi-layer perceptron's with deep layers may also be used.

The risk score 122 may predict a success rate associated with installation of the software update 112 on at least a portion of the multiple computing devices 102(1) to 102(N). The server 104 may determine variables 140 associated with the software package 118 and determine the risk score 122 based on the variables 140. For example, the variables 140 may include one or more of a size of the software package 112, a reboot variable associated with the software package 112 indicating whether a reboot is to be performed after installing the software package 112, and an installation type indicating whether the software package 112 is a first install or an upgrade to a previously installed software package. The plurality of variables 140 may include one or more of: a provider variable identifying a provider of the software package 112 (e.g., the provider may be a manufacturer of the computing devices 102 or one of the vendors 110), a validation variable indicating a number of validation passes that the software package 112 underwent prior to the software package 112 passing the verification 116, an installation time variable indicating an average installation time to install the software package 112, a software package variable indicating whether the software package 112 includes a native application (e.g., written in a code native to the processor of the computing devices 102), a universal application (e.g., written in an interpreted language, such as Java®), a driver, a firmware update, or a basic input/output system (BIOS), a region variable indicating one or more particular geographic regions where the software package 112 is to be provided, a platform variable indicating one or more particular computing device platforms in which the software package 112 is to be installed, an operating system variable indicating a particular operating system or a particular operating system version associated with the software package 112, or a deployment timing variable indicating when the software package 112 is to be deployed (e.g., time of day, day of week, month of the year, season, or other time related information). The variables 140 may include at least one of: a development team variable identifying information associated with a development team that created the software update 112 included in the software package 118 or a validation team variable identifying additional information associated with a validation team that validated (e.g., performed the verification 116 of) the software package 112.

In some cases, the risk score 122 may be scaled to be between 0 and 100, with 0 indicating a low risk (e.g., very high predicted success rate) and 100 indicating a high risk (e.g., very low predicted success rate). In other cases, the risk score 122 may be scaled to be a fractional value between 0 and 1, with 0 indicating a low risk (e.g., very high predicted success rate) and 1 indicating a high risk (e.g., very low predicted success rate). Of course, other scaling may also be used. For example, a reverse scale, with 100 indicating a low risk (e.g., very high predicted success rate) and 0 indicating a high risk (e.g., very low predicted success rate) may be used.

After the machine learning 120 determines the risk score 122, the server 104 may determine whether to deploy the software package 118 and how to deploy the software package 118. For example, the risk score 122 and those of the variables 140 that most influence the risk score 122 may be used to select a particular one of the deployment strategies 124. For example, if the software package 118 is fairly large in size as compared to other software packages, in regions where network connectivity is poor or there is limited bandwidth, the large size may cause the software package 118 to fail to download and may require multiple download attempts. In such instances, an appropriate one of the deployment strategies 124 may be selected. For example, the selected deployment strategy may initially deploy the software package 118 to regions, such as, for example, North America, where a large portion of the computing devices 102 have excellent network conductivity and relatively high bandwidth, before deploying the software package 118 in other regions. One of the deployment strategies 124 may include deploying the software package 118 to geographic region 1, followed by region 4, followed by region 2, followed by region 6, and so on. Another of the deployment strategies 124 may include deploying the software package 118 to computing platform 1, followed by computing platform 2, followed by computing platform 3, and so on. Yet another of the deployment strategies 124 may include deploying the software package 118 to a first version (e.g., Windows® 10) of an operating system, followed by a second version (e.g., Windows Server) of the operating system, and so on. Another of the deployment strategies 124 may include deploying the software package 118 to a first region in a first month, followed by deploying to a second region in a second month, and so on.

Each of the computing devices 102 may include a corresponding agent 130, events 132, device data 134, and user preferences 150. The agent 130 may gather information about corresponding computing device 102, include the device data 134 and the events 132 occurring on the computing device 102. The events 132 may include for example, information about events that have occurred on the computing device 102, including installation logs, how many restarts occurred, how many application crashes occurred, and the like. For example, the events 132 may include one or more logs (e.g., installation log, uninstall log, and the like), a memory dump, an application crash, an operating system restart (e.g., non-user initiated), a stop error or a fatal error (e.g., blue screen of death (BSOD)), customer-initiated contact (e.g., a call to a help line, a chat session with a support staff, an email to support staff, and the like), a yellow color and/or question mark in a Device Manager associated with the operating system, and the like. The device data 134 may include information associated with each of the corresponding computing devices 102, such as a unique identifier 152 (e.g., serial number, service tag, or the like), a software configuration, a hardware configuration, one or more software applications installed on the computing device 102, which of the applications are being used and how often each of the software applications are being used, which hardware components of the computing device 102 are being used, and how often, which peripheral devices are connected to the computing device 102, and other computing device related information. The agent 130 may gather the events 132 and the device data 134. The agent 130 may send data 136 (e.g., telemetry data) that includes the events 132 and the device data 134, to the server 104. For example, the agent 130 may send the device data 134 to the server 104 (1) at predetermined intervals (e.g., every week, every month or the like), (2) in response to a set of events (operating system restarts, application crashes, and the like) occurring within a predetermined time period (e.g., 15 minutes, 30 minutes, or the like), (3) a predetermined period of time (e.g., an hour, 8 hours, 12 hours, 24 hours, or the like) after installing the software package 118.

In some cases, the agent 130 may periodically send a query 128 to the server 104 asking the server 104 if a software package is available for download. After the server 104 receives the quarry 128, the server 104 may make the software package 118 available for download. For example, the server 104 may make the software package 118 available for one or more of the agents 130 to download to a corresponding one of the computing devices 102.

An installer included in the software package 118 may create an installation log. The installation log may include information as to whether the software package 118 was successfully installed and events 132 associated with the installation. The agent 130 may gather the events 132 that includes events that occurred during and after the installation of the software package 118. The agent 130 may periodically send the device data 134, in the form of data 136, to the server 104. The server 104 may store the device data 134(1) to 134(N) in a storage device of the server 104. The server 104 may extract the events 132 associated with the software package 118 from the data 134. The server 104 may determine a stability index 142 associated with the software package 118 and associated with the configuration identified by the unique identifier 152 and store the stability index 142 in a stability index table 146 (or other data structure).

The device data 134(1) to 134(N) may be added to the training data 148 that was used to train the machine learning module 120. The training data 148 with the added device data may be used to re-train the machine learning module 120. The device data 134 may include information about each computing device, such as which operating system and which version of the operating system is currently installed, which software applications are installed, which computing platform each computing device is based on, and the like. In this way, the machine learning module is able to further correlate the device data 134 with the risk score 122.

One or more of the computing devices 102 may receive (i) a link to install the software package 118 and (ii) the corresponding stability index 142 associated with the software package 118 for the particular configuration of each of the computing devices 102. The agent installed on each of the computing devices 102 may download and determine whether to install the software package 118.

When one of the computing devices 102 is notified by the server 104 that the software package 118 is available for installation, the computing device 102 may send the computing device's unique identifier 152 to the server 102. Based on the unique identifier 152, the server 104 may determine the platform and configuration of the computing device 102 and retrieve the current stability index 142 associated with the software package 118 and configuration (e.g., included in the devices data 134) from the stability index table 146. The server 14 may send to the computing device 102 (1) a download link (or other download-related information) for the software package 118 and (2) the corresponding stability index 142. The computing device 102 may check the user preferences 150 to determine a user preference regarding installing the software package 118. For example, some users, such as early adopters, may specify that the software package 118 is to be installed regardless of the stability index 142. Other users, such as more conservative users, may specify that the software package 118 is to be installed when the stability index 142 is greater than a threshold amount (e.g., at least 90%, at least 95%, at least 98%, or the like). Still other users, who want more control over the computing device 102, may specify that the computing device 102 is to present a user interface displaying information about the software package 118 and the corresponding stability index 142, and the user may select whether the software package 118 is to be installed and if so, when the software package 118 is to be installed. In addition, some users who are satisfied with the stability of their current software configuration may specify that no software packages are to be installed or that no software packages for a particular component of the computing device are to be installed. For example, a gamer may specify that no new software packages (e.g., drivers) are to be installed for a graphics card. As another example, a workstation user may specify that no new software packages (e.g., software updates) are to be installed for a particular software application.

Thus, a software update created by a development team internal to a computer manufacturer or by an external vendor may be provided to a manufacturer. The manufacturer may perform testing and verification of the software update and create a software package based on the software update. The server may package the software update with other software (e.g., .NET framework, Visual C++, and the like) used by the software update to create a software package. For example, the software package may include an installer application to install the software update. A server of the manufacturer may determine variables associated with the software package, including a size of the software package, whether a restart is to be performed after the software package is installed, and the like. The server may determine, based on the variables, a risk score associated with the software package. The risk score may predict a success rate associated with installing the software package on multiple computing devices. For example, a high-risk score may indicate a high risk that the software package will be unsuccessful while a low risk score may indicate a low risk that the software package will be unsuccessful during installation. Based on the risk score and based on the particular variables that have the most influence on the risk score, the server may select a particular deployment strategy. For example, the deployment strategy may perform a selected rollout to reduce the influence of the variables that have the most adversely effect on the risk score. To illustrate, if a particular operating system (or operating system version) is decreasing the risk score, the software package may initially be deployed to those computing devices that have a particular operating system (or a latest version of a particular operating system) before being deployed to computing devices with other operating systems (or other versions). As another illustration, if a particular computing device platform, such as a consumer platform, is adversely influencing the risk score, the software package may initially be deployed to a workstation platform (e.g., Dell® Precision), followed by deployment to a business platform (e.g., Dell® Latitude), and then deployed to a consumer platform (e.g., Dell® Inspiron). The deployment may include placing the software package in a download area and either (1) sending a message instructing an agent installed on each computing device to download and install the software package or (2) in response to receiving a query from the agent asking if an update is available, send the computing device a download link to the software package in the download area.

The agent may determine the corresponding stability index of the software package. The agent may check a user preference and: (1) automatically download and install the software package when the stability index satisfies a user specified threshold, (2) not install the software package when the stability index fails to satisfy a user specified threshold, or (3) display the information about the software package, display the stability index, and determine, based on a response received from the user, whether the software package is to be installed and if so when the user desires that the software package be installed. In this way, computer users may select which software updates to install and avoid installing software updates that may cause their computing devices to become unstable.

FIG. 2 is a block diagram 200 illustrating an example of predictor variables (e.g., the variables 140 of FIG. 1) used to determine a risk score associated with a software update, according to some embodiments. The variables 140 may include software package variables 202, OTA deployment variables 204, deployment timing variables 206, development variables 208, and validation variables 210.

The software package variables 202 may include a package type (P1), a package size (P2), an average time for installation (P3), a reboot requirement (P4), whether the software package is a first install or an upgrade (P5), and other package related information. Thus, P1, P2, P3, P4, and P5 are sub-variables of the software package variables 202. For example, the package type may indicate whether the software is a native code (e.g., x86) application or a universal application, e.g., written in Java® or another type of interpreted language. The package type may indicate whether the software package includes firmware, a driver, a BIOS update, or another type of software update. The package size may indicate (e.g., in megabytes) a size of the software package. For example, larger software packages may take more time to download, particularly in regions where network connectivity is poor or bandwidth is low. In such regions, larger software packages may have a lower success rate as the download of the software package may be started and stopped multiple times. The average time for installation adversely affect and influence the success of a software update. For example, a longer installation time may be indicative that the installation process is relatively complex and may increase the possibility of failing during installation, as compared to smaller software updates. The software package variables 202 may include whether the software update has a reboot requirement. The reboot requirement may indicate whether a reboot is to be performed after the software package is installed. For example, after an installer installs the software package, the installer may perform a reboot of the operating system. The reboot requirement may be indicative of the complexity of the software package. For example, a software package that requires a reboot of the operating system after installation may be more prone to failure during installation as compared to a software update that does not require a reboot after installation. The software package variables 202 may indicate whether the software package is a first-time installation or an upgrade to an existing installation. For example, a first-time installation installing an application for the first time may be more prone to failure as compared to upgrading an existing software installation to add new features or address one or more bugs.

The OTA deployment variables 204 may identify particular geographic regions (01) in which the software update may be deployed (e.g., made available for download). For example, some software packages may be country specific or region specific and may not be made available around the world. To illustrate, an update to help files written in Japanese may be made available in Japan or in Asia but not in North America. The OTA deployment variables 204 may include one or more particular computing platforms (02) that the software update is targeting. For example, the software update may be deployed to computing devices based on a particular computing platform, e.g., one of consumer (e.g., Dell® Inspiron), business (e.g., Dell® Latitude), workstation (e.g., Dell® Precision), or gaming (e.g., Dell® Alienware). To illustrate, a particular software package may update a driver of a graphics card for a gaming system and may target and be deployed to a gaming platform (e.g., Dell® Alienware) but may not target and may not be made available to consumer, business, or workstation platforms. The OTA deployment variables 204 may include one or more operating systems (e.g., Windows®, Linux, or the like) or operating system versions (e.g., Windows® 7, Windows® Vista, Windows® 10, or the like) that the software update is targeting (O3). For example, the software update may be designed to add features or address features for Windows 10 and may not be made available for computing devices with earlier versions, such as Windows® 7. The OTA deployment variables 204 may include other specific target deployment variables. For example, some software updates (e.g., drivers for a drop sensor, a touchpad, or the like) may target laptops and may not be made available for desktop devices. As another example, some software updates may target desktop computing devices but not laptop devices.

The deployment timing variables 206 may include information identifying when the software package will be made available for download, such as, for example, whether the software update is to be deployed on a weekday or a weekend, which particular day of the week (T1), and the like. For example, the software package may be made available on Tuesday at midnight (e.g., for consumers) or on Saturday at midnight (e.g., for business customers) to minimize any disruption caused by the software package being downloaded and installed. As another example, the deployment strategy may stagger the deployment of the software package throughout the week to prevent download requests from timing out due to so the download server being overwhelmed by download requests. The deployment timing variables 206 may include a time of day (T2), such as morning, afternoon, evening or a specific time such as 11:00 AM, 11:00 PM or the like. For example, if multiple updates are due to be deployed and a first update is to be installed before a second update can be installed then the first update may be provided first and then the second update may be provided at later time. The deployment timing variables 206 may include a particular month (T3), a particular season (T4), or other timing related information for the deployment of the software package. For example, a software package may be rolled out prior to a particular season, such as prior to the start of colleges or universities as the software or maybe used by a particular learning software.

The deployment variables 208 may include information about a provider of the software update, such as whether the provider (D1) is an internal team or an external vendor, a team/department (D2) that created the software update, a lead developer (D3) of the software update, an architect (D4) of the software update, and other development related information. For example, historical data may reveal that some vendors provide software updates that are well tested and verified and typically install without any issues (or with minimal issues). On the other hand, historical data may show that other vendors supply software updates that have not been thoroughly tested or verified and that may cause installation issues. In this way, the provider may be taken into account when determining the risk score. The team that developed the software update may be identified. For example, a manufacturer of the computing devices may provide incentives for teams or departments to develop bug free software updates. The installation success rate may be used to rate interval development teams. Teams that provide software packages that install with less than a predetermined number of installation issues may be rewarded while teams that provide software packages that install with at least a predetermined number of installation issues may be asked to revise their test and verification procedures to improve the quality of the software updates that they create.

The validation variables 210 may include information associated with how the software update was validated, such as who (V1) performed the validation (e.g., internal team or external vendor), the name of the validation team (V2), the manager (V3) of the validation team, the number of unique configurations that were tested (V4), the number of validation passes (V5) before the software update was approved for deployment, and other validation related information. For example, the machine learning model may learn that a software update that requires more than a particular number of validation passes may be more prone to installation issues and so such a software package may negatively impact the risk score.

The number of sub-variables for 202, 204, 206, 208, and 210 may vary. For example, 202 may have N sub-variables, 204 may have M sub-variables, 206 may have Q sub-variables, 208 may have R sub-variables, and 210 may have S sub-variables, where N, M, Q, R, and S are integers greater than 0 and are not necessarily equal to each other.

FIG. 3 is a block diagram 300 illustrating examples of predictor variables used to train a machine learning algorithm, according to some embodiments. For example, recursive partitioning using a conditional inference tree may be used to partition the training data 148 of FIG. 1. The predictor variables 200 illustrated in FIG. 2 may be mapped using supervising learning, such as, for example, Random Forest.

The risk score (S) 122 may be determined as a function ($f$) of the predictor variables, e.g., the software package variables (P) 202, the OTA deployment variables (O) 204, the deployment timing variables (T) 206, the development variables (D) 208, and the validation variables (V) 210. For example, S=$f$(P, O, T, D, V). As illustrated in FIG. 2, each of the predictor variables 200 may include multiple sub-variables. Thus, a matrix X may include the predictor variables 200, including sub-variables. β includes the coefficients that are learned by the machine learning module 120 using the training data 148 during the training process. In some cases, such as when using linear regression or logistic regression, the matrix X may be multiplied by β to determine the function $f=\beta_0 P_{11}+ \ldots \beta_1 P_{12} \ldots$ and so on.

Figure 4:
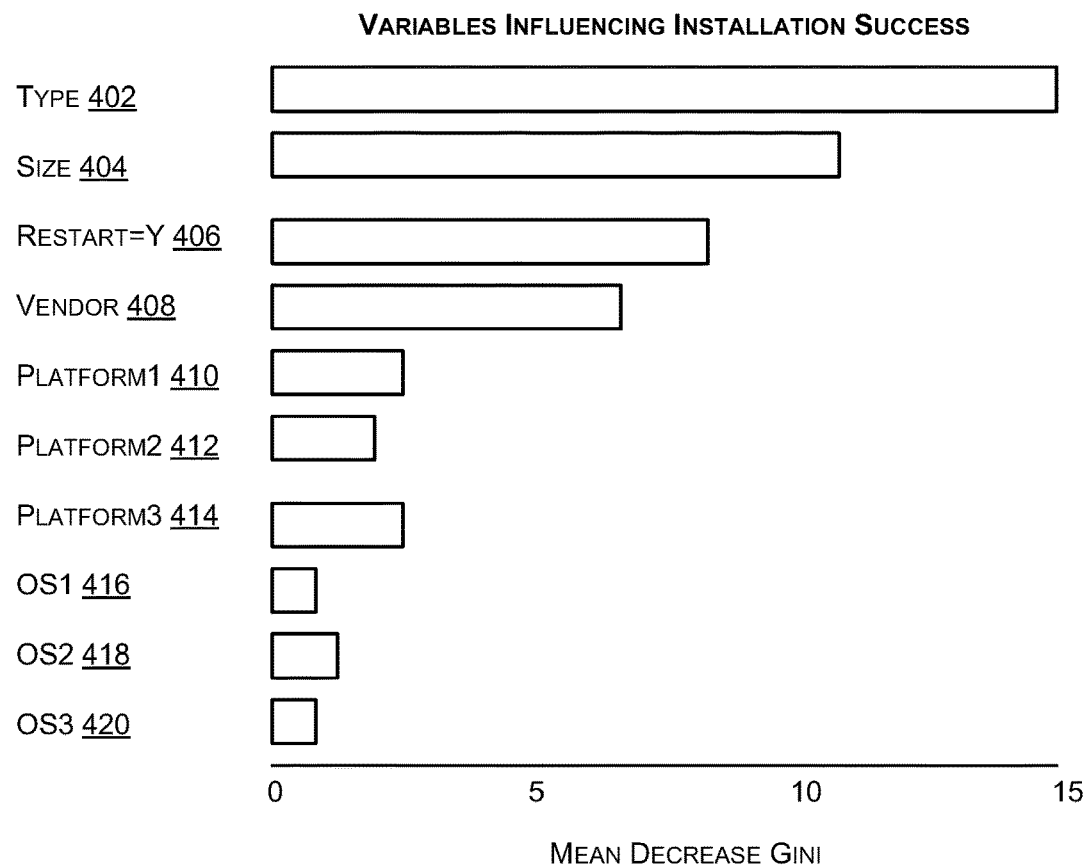
FIG. 4 is a block diagram illustrating an analysis of predictor variables and each predictor variable's influence on a successful installation of a software update, according to some embodiments.

FIG. 4 is a block diagram 400 illustrating an analysis of predictor variables and each predictor variable's influence on a successful installation of a software update, according to some embodiments. The y-axis may include various variables that influence installation success (and hence the risk score 122 of FIG. 1). The x-axis may include a mean decrease Gini, e.g., a coefficient measuring how each variable contributes to the success of the installation of the software package 118 (e.g., the homogeneity of the nodes and leaves in the resulting random forest). For example, each time a particular variable is used to split a node, the Gini coefficient for the child nodes are calculated and compared to that of the original node. Of course, in other implementations, depending on the machine learning model being used, other metrics may be used to measure the importance of individual variables.

In FIG. 4, a type 402 (e.g., driver, firmware, BIOS, or software application) of the software package 118 of FIG. 1, a size 404 of the software package 118, a restart requirement 406 of the software package 118, and a vendor 408 of the software package may significantly influence the risk score 122. As illustrated in FIG. 4, particular platforms 410, 412, and 414 that are targeted by the software package 118 of FIG. 1 may have less of an influence on the risk score 122 as compared to variables 402, 404, 406, and 408. Furthermore, in the example illustrated in FIG. 4, operating systems 416, 418, and 420 may have the least influence on the risk score 122.

Figure 5:
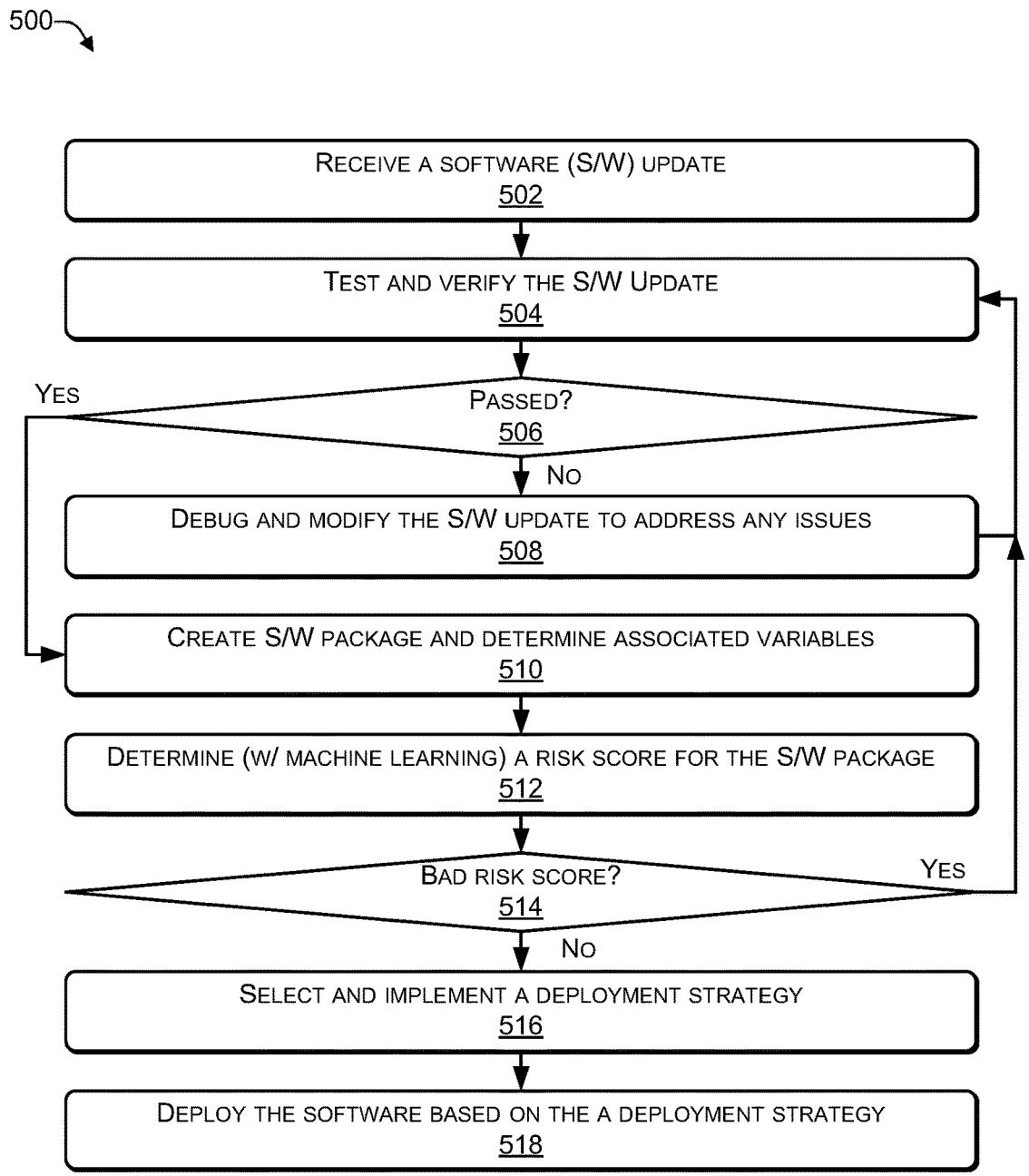
FIG. 5 is a flowchart of a process that includes determining a risk score for a software update, according to some embodiments.
Figure 6:
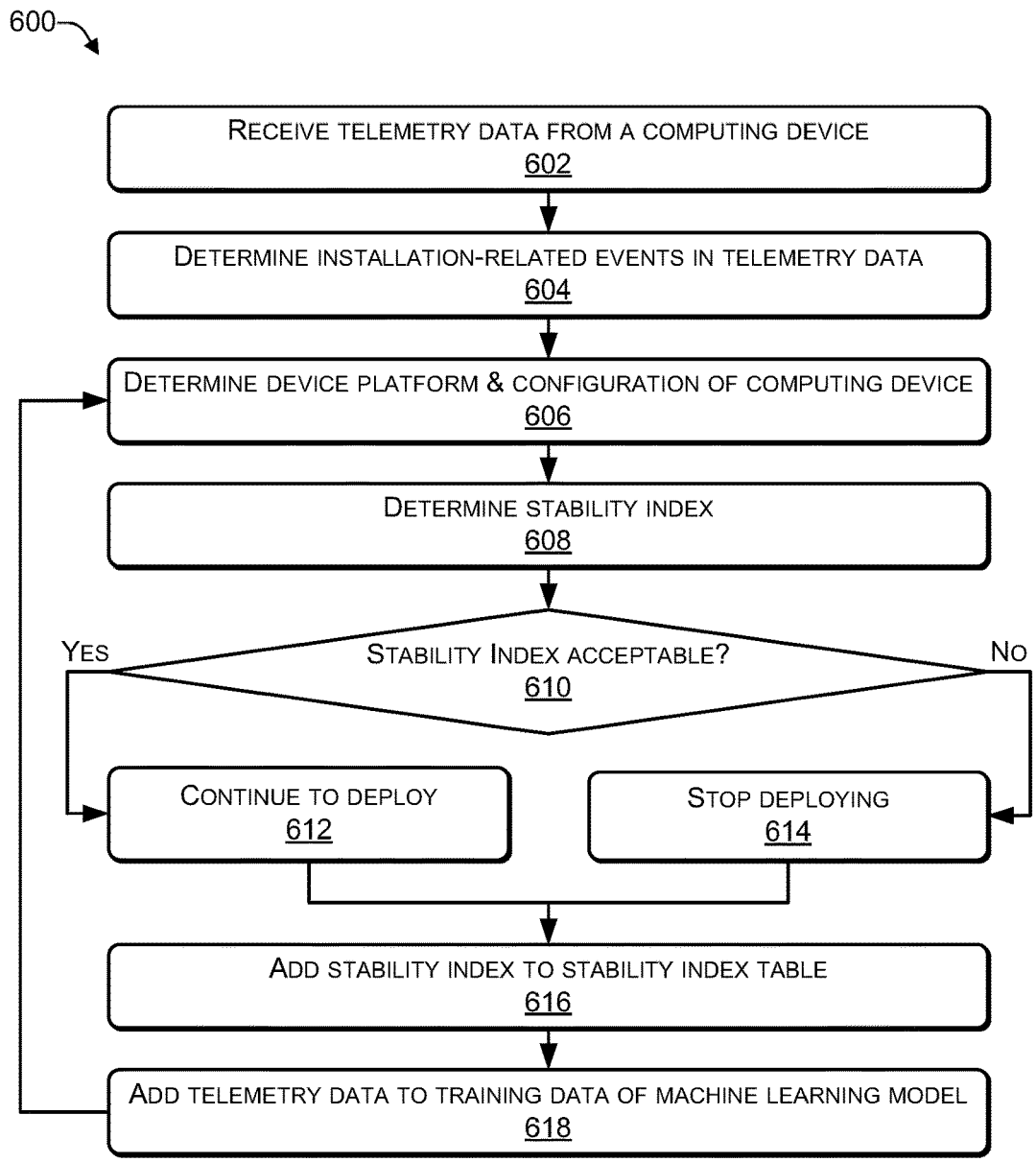
FIG. 6 is a flowchart of a process that includes determining a stability index for a software update, according to some embodiments.
Figure 7:
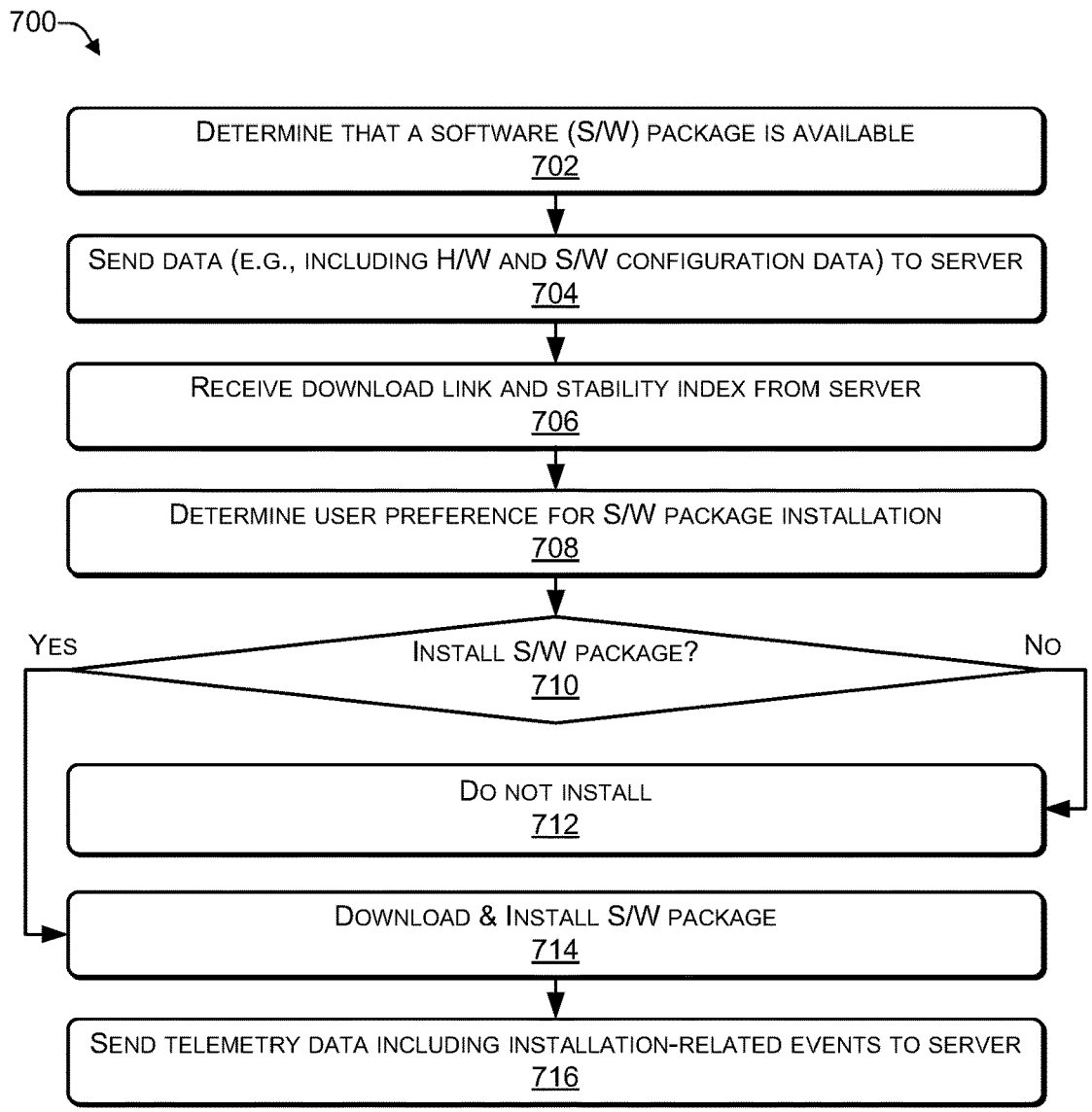
FIG. 7 is a flowchart of a process that includes receiving a download link and a stability index associated with a software update, according to some embodiments.

In the flow diagram of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to FIGS. 1, 2, 3, and 4, as described above, although other models, frameworks, systems and environments may be used to implement this process.

FIG. 5 is a flowchart of a process 500 that includes determining a risk score for a software package, according to some embodiments. The process 500 may be performed by one or more components of the server 104 of FIG. 1.

At 502, a software update may be received. At 504, the software update may be validated and tested. At 506, a determination may be made whether the software passed the testing and validation. If a determination is made, at 506, that the software passed the test process and the verification process, then the process may proceed to 510. If a determination is made, at 506, that the software did not pass the test and/or verification processes, then the process may proceed to 508, where the software may be debugged and modified to address any issues, after which the process may proceed back to 504. The process may repeat 504, 506, 508 until the software update passes the test and verification processes. For example, in FIG. 1, the server 104 may receive the software update 112 from an internal development team 108 or from an external vendor 110. The server 104 may perform the testing 114 and the verification 116 on the software update 112 and until the testing 114 and the verification 116 passes, indicating that the software 112 is ready for deployment.

At 510, a software package may be created (e.g., based on the software update) and one or more variables associated with the software update may be determined. For example, in FIG. 1, the server 104 may create the software package 118 that includes an installer and files associated with or used by the software update (e.g., .NET framework, Visual C++, and the like). For example, a software package may include a firmware update to a hardware component, a driver update, and a software application update that takes advantage of the updated firmware and updated driver. The server 104 may determine the variables 140 associated with the software package 118.

At 512, a machine learning module may be executed to determine a risk score for the software package. At 514, a determination may be made whether the risk score is bad (e.g., indicating a poor success rate for the installation of the software package). If a determination is made, at 514, that the risk score is bad, then the process may proceed to 504, where additional testing and verification may be performed. If a determination is made, at 514, that the risk score is not bad (e.g., indicating an excellent success rate for the installation of the software package), then the process may proceed to 516, where a deployment strategy may be selected and implemented. For example, in FIG. 1, the machine learning module 120 may determine the risk score 122 based on the variables 140 associated with the software package 118. If the server 104 determines that the risk score 122 does not satisfy a predetermined threshold, e.g., indicating that the success rate is predicted to be below a predetermined amount, then instead of being deployed the software package 118, the software package 118 may undergo further testing 114 and verification 116. If the server 104 determines that the risk score 122 satisfies the predetermined threshold, e.g., indicating that the success rate is predicted to be at least a predetermined amount, then the server 104 may select one of the deployment strategies 124 and deploy the software package 118 to the computing devices 102. The server 104 may select a particular deployment strategy from the multiple deployment strategies 124 based in part of a subset of the variables 140 that have the most negative influence on the risk score 122. For example, assume the size 404 of FIG. 4 has the most influence on the risk score 122, e.g., because a large software package may encounter download issues in countries where network connectivity is poor or bandwidth is low, causing a low installation rate. In such cases, the deployment strategy that is selected may initially provide the software package 118 in a particular region, such as North America, where network connectivity is excellent and bandwidth is relatively high, before providing the software package 118 in other regions.

Thus, a software update created (1) by a development team internal to a computer manufacturer or (2) by an external vendor, may be provided to a manufacturer. The manufacturer may perform testing and verification of the software update and create a software package based on the software update. The server may package the software update with other software (e.g., .NET framework and the like) used by the software update to create a software package. For example, the software package may include an installer application to install the software update. A server of the manufacturer may determine variables associated with the software package, including a size of the software package, whether a restart is to be performed after the software package is installed, and the like. The server may determine, based on the variables, a risk score associated with the software package. The risk score may predict a success rate associated with installing the software package on multiple computing devices. For example, a high-risk score may indicate a high risk that the software package will be unsuccessful while a low risk score may indicate a low risk that the software package will be unsuccessful during installation. Based on the risk score and based on the particular variables that most negatively influence the risk score, the server may select a particular deployment strategy. For example, the deployment strategy may perform a selected rollout to reduce the influence of the variables that have the most adversely effect on the risk score. To illustrate, if a particular operating system (or operating system version) is decreasing the risk score, the software package may initially be deployed to those computing devices that have a particular operating system (or a latest version of a particular operating system) before being deployed to computing devices with other operating systems (or other versions). As another illustration, if a particular computing device platform, such as a consumer platform, is adversely influencing the risk score, the software package may initially be deployed to a workstation platform (e.g., Dell® Precision), followed by deployment to a business platform (e.g., Dell® Latitude), and then deployed to a consumer platform (e.g., Dell® Inspiron). The deployment may include placing the software package in a download area and either (1) sending a message instructing an agent installed on each computing device to download and install the software package or (2) in response to receiving a query from the agent asking if an update is available, send the computing device a download link to the software package in the download area.

FIG. 6 is a flowchart of a process 600 that includes determining a stability index for a software update, according to some embodiments. The process 600 may be performed by the server 104 of FIG. 1.

At 602, telemetry data (e.g., including installation logs for the software package 118) may be received (e.g., from computing devices that downloaded and installed the software package 118) and used to track a stability of the software package. At 604, events in the telemetry data that are related to the installation of a software package may be determined. At 606, a device platform and a configuration of the computing device (e.g., that sent the telemetry data) may be determined. For example, in FIG. 1, the server 104 may receive the telemetry data 136 from one of the computing devices 102. To illustrate, the server 104 may receive the device data 134(N) from the computing device 102(N). The server 104 may examine the events 132(N) and identify portions of the events 132(N) that are associated with the installation of the software package 118, such as, for example, installation logs and other events that occurred within a predetermined period of time (e.g., 15 minutes, 30 minutes, 1 hour, or the like) after the installation of the software package 118 was initiated. The server 104 may use the unique identifier 152(N) included in the device data 134(N) to determine a device platform associated with the computing device 102(N) and a configuration associated with the computing device 102(N).

At 608, a stability index may be determined. At 610, a determination may be made whether the stability index is acceptable (e.g., whether the stability index satisfies a threshold). If a determination is made, at 610, that the stability index is acceptable, then the process may proceed to 612, where the deployment of the software package may continue. If a determination is made, at 610, that the stability index is unacceptable (e.g., installation of the software package causes the computing device to become unstable), then the process may proceed to 614, where the deployment of the software package may be temporarily stopped. For example, in FIG. 1, the software package 118 may be downloaded and installed on one or more of the computing devices 102. During installation, an installation log may be created that includes information as to a success or failure of the installation process and any errors/issues encountered. The agent 130 may gather the device data 134, including the events 132 that are (1) associated with installing the software package 118 and (2) caused after installing the software package 118. Periodically or in response to an event or a set of events (e.g., multiple operating system restarts or application crashes within a predetermined period of time after the installation), the agent 130 may send the device data 134 to the server 104. The server 104 may extract, from the device data 134, the events 132 associated with the installation of the software package 118. As new telemetry data is received, the server 104 may recalculate (e.g., update) one or more of the stability indices in the stability index table 146. For example, for a particular software package, a stability index may be determined for each configuration of each computing device platform. For example, if the stability index 142 indicates that the software package 118 causes instability on a particular computing device platform (e.g., Inspiron) but not on other computing device platforms (e.g., Latitude, Precision, and Alienware), then deployment to the particular computing device platform may be temporarily stopped while deployment to other computing device platforms may continue. If deployment is temporarily stopped, the software package may undergo further testing, verification, and modification to address the issues before deployment is resumed to the particular computing device platform.

At 616, the stability index (determined at 608) may be added to a stability index table. For example, in FIG. 1, the stability index 142 may be added to the stability index table 146 based on the associated configuration and platform. The contents of the stability index table 146 are illustrated in FIG. 8.

At 618, the telemetry data (e.g., received from the computing devices that installed the software package) may be added to training data to create updated training data that may be used to re-train the machine learning model, and the process may proceed to 602 where additional telemetry data may be received. For example, in FIG. 1, the device data 134 that includes information about the computing device, such as the device platform, the operating system version, the installation logs, and the like may be added to the training data 148 and used to re-train (to improve the accuracy of) the machine learning module 120.

Thus, after an agent on a computing device has downloaded a software package from a server, the agent may install the software package by executing an installer application in the software package. The installer may create an installation log indicating whether the installation was successful and identifying errors and issues during the installation process and a for a predetermined amount of time after the installation has been performed. The agent may gather data about the computing device, including the computing platform (e.g., hardware), the operating system and version, events that occurred on the computing device (including logs, such as the installation log), device platform, and the like. The agent may periodically send the gathered data to the server. The server may determine a stability index associated with the software package and associate the stability index with a particular configuration of a particular platform by storing the stability index in a stability index table. If the stability index fails to satisfy a particular threshold, then the software package may not be deployed to computing devices having the same (or similar) platform and configuration.

FIG. 7 is a flowchart of a process 700 that includes receiving a download link and a stability index associated with a software update, according to some embodiments. The process 700 may be performed by one or more components of a computing device, such as one of the computing devices 102 of FIG. 1.

At 702, the computing device may determine that a software package is available. At 704, the computing device may send data (including configuration data) to the server. At 706, the computing device may receive (1) a download link (for the software package) and (2) a stability index (associated with the software package and the computing device's device platform and configuration). For example, in FIG. 1, the computing device 102(N) may send a query 128 to the server 104, and in response, the server 104 may notify the computing device 102(N) that the software package 118 is available (e.g., because the software package 118 is applicable to the computing device 102(N)). The computing device 102(N) may send the server 104 the data 134(N) including information identifying a platform and a configuration of the computing device 102(N). In response, the server 104 may identify the corresponding stability index 142 from the stability index table 146 and send the computing device 102(N) a link to access the software package 118 and the stability index 142 associated with the software package 118.

At 708, the computing device may determine a user preference associated with installing a software package. At 710, the computing device may determine whether to install the software package. For example, in FIG. 1, the computing device 102(N) may determine the user preferences 150(N), including a user preference indicating whether to (1) automatically install the software package 118, (2) not install the software package 118, or (3) query the user to determine if the user desires that the software package 118 be installed. For example, some users, such as early adopters, may specify that the software package 118 is to be installed regardless of the stability index 142. Other users, such as more conservative users, may specify that the software package 118 is to be installed when the stability index 142 is greater than a threshold amount (e.g., at least 90%, at least 95%, at least 98%, or the like). Still other users may specify that when the software package 118 is made available, the computing device 102(N) is to present a user interface displaying information about the software package 118 and the corresponding stability index 142, and the user may select whether the software package 118 is to be installed or not. If the user selects to install the software package 118, the user may select a day and time when the software package is to be installed. In addition, some users who are satisfied with the stability of their current software configuration may specify that no software packages are to be installed or that no software packages for a particular component of the computing device 102(N) are to be installed. For example, a gamer may specify that no new software packages (e.g., drivers) are to be installed for a graphics card. As another example, a workstation user may specify that no new software packages (e.g., software updates) are to be installed for one or more software applications.

If, at 710, the computing device determines not to install the software package, then the process may proceed to 712 and the software package may not be downloaded or installed. For example, in FIG. 1, if the user preferences 150(N) indicate that the user desires that software package 118 not be installed or if the computing device queries the user and the user responds that the software package 118 not be installed, then the software package 118 may not be installed.

If, at 710, the computing device determines to install the software package, then the process may proceed to 714, where the software package may be downloaded and installed. For example, in FIG. 1, if the user preferences 150(N) indicate that the user desires that the software package 118 be installed or if the computing device queries the user and the user responds that the software package 118 is to be installed, then the computing device 102(N) may download and install the software package 118.

At 716, the computing device may send telemetry data, including installation-related events, to the server. For example, in FIG. 1, the agent 130(N) may gather events associated with the installation of the software package 118 and with events occurring for a predetermined time (e.g., 15 minutes, 30 minutes, 1 hour or the like) after the installation and send the gathered device data 134(N) to the server 104. The server 104 may use the device data 134(N) to update the stability index 142 associated with the software package 118.

FIG. 8 is an example of a stability index table, according to some embodiments. FIG. 8 illustrates an example of entries in the stability index table 146 of FIG. 1. For example, a manufacturer may have multiple platforms (e.g., Dell® Inspiron, Latitude, Precision, and Alienware), and each platform may have multiple configurations based on the processor (e.g., Intel® i3, i5, or i7), type (e.g., mechanical or solid-state drive (SSD)) of drive, capacity of the drive (e.g., 512 GB, 1 TB, or the like), amount of random access memory (RAM), type of video processor, and the like.

As illustrated in FIG. 8, the manufacturer may have a 1st platform 802 (e.g., a consumer platform, such as Dell® Inspiron), a 2nd platform 804 (e.g., a business platform, such as Dell® Latitude), a 3rd platform 806 (e.g., a workstation platform, such as Dell® Precision), and an Nth platform 808 (e.g., a gaming platform Dell® Alienware), where N>0. Each of the platforms 802, 804, 806, 808 may have multiple configurations. For example, the first platform 802 may have M configurations (M>0), such as a configuration 810(1) to a configuration 810(M). The second platform 804 may have P configurations (P>0), such as a configuration 812(1) to a configuration 812(P). The third platform 806 may have Q configurations (Q>0), such as a configuration 814(1) to a configuration 814(Q). The Nth platform 808 may have R configurations (R>0, and where M, N, O, P, and R are not necessarily equal to each other), such as a configuration 816(1) to a configuration 816(R).

Thus, the Y-axis of the stability index table 146 may have rows of configurations of particular platforms. The X-axis of the stability index table 146 may have various software packages. For example, three versions of a particular software package are illustrated in FIG. 8, software package 826 (e.g., V1.0), software package 828 (e.g., V1.1), and software package 830 (e.g., V2.0). Of course, other software versions, may be located along the X-axis. Each of the software packages 826, 828, and 830 may include a driver update, a firmware update, a software patch, a software application update, a BIOS update, or any combination thereof.

In FIG. 8, each entry in the stability index table 146 may indicate a stability, expressed as a percentage from 0 to 100, of the stability of a particular software package. For example, the software package 828 may be 100% stable for the configuration 812(P) of the $2^{nd}$ platform 804 but only 81% stable for the configuration 814(Q) of the 3rd platform 806. Thus, the software package 828 may be recommended for deployment to computing devices having the configuration 812(P) of the 2nd platform 804 but may not be recommended for deployment to computing devices having the configuration 814(Q) of the 3rd platform 806.

FIG. 9 is an example of a formula to determine a stability index, according to some embodiments. For example, the server 104 may determine the stability index 142 based on a formula that takes into account one or more of a type of event 902, a weight 904, a number of that type of event 904, a number of installations 908, and a scaling factor 910.

The type of event 902 may identify whether the event is a log, a memory dump, an application crash, an operating system restart, a BSOD, a customer-initiated contact (e.g., call, chat, email, forum post, and the like), a yellow question mark next to a device in Device Manager, or another type of event.

The weight 904 may be used to give some types of events a greater weight (e.g., importance) than other types of events. To illustrate, a spontaneous (e.g., non-user initiated) restart of the operating system may be given greater weight than an installation log indicating that the computing device had a different version of .NET framework than expected.

The number of events 906 occurring and the number of installations 908 may be used to give more importance to frequently occurring events as compared to infrequent events. For example, a particular event (e.g., O/S restart) may be weighted heavily but may only occur once every 100 installations. In this example, the low frequency of occurrence may not necessarily indicate an issue. As another example, a particular event (e.g., device manager indicates a yellow question mark next to a device after installation) may have a relatively low weight but may occur 90 times in every 100 installations, indicating that the software package may have an issue. When the same type of event occurs frequently, e.g., for a majority of installations, then the software package may have an issue and may need to be modified.

The scaling factor 910 may scale the result of taking into account 902, 904, 906, and 908. For example, the stability index 142 may be expressed as a fraction between 0 and 1, a number between 0 and 100 (e.g., a percentage), or another range.

Figure 10:
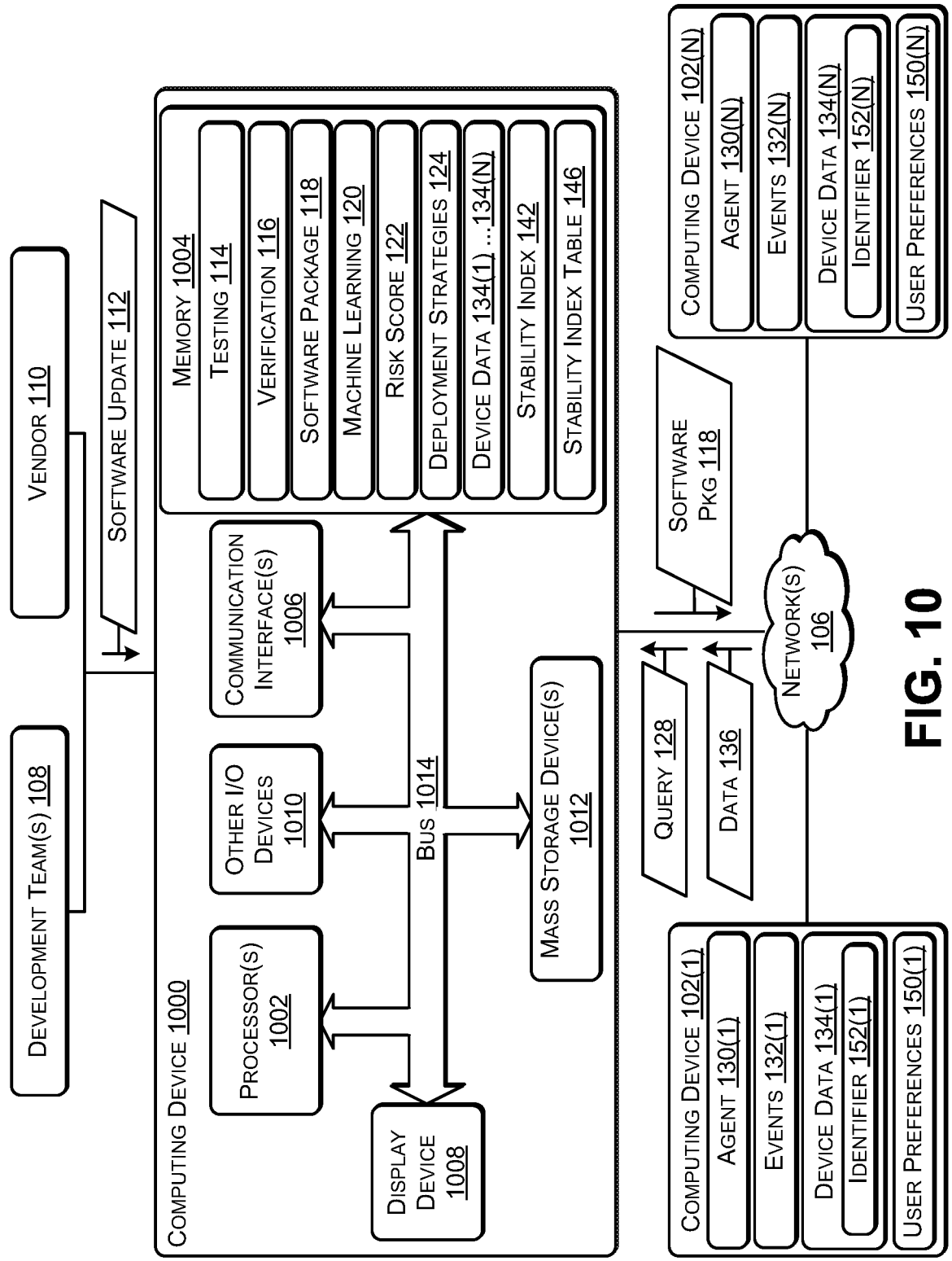
FIG. 10 illustrates an example configuration of a computing device that can be used to implement the systems and techniques described herein.

FIG. 10 illustrates an example configuration of a computing device 1000 that can be used to implement the systems and techniques described herein, such as for example, the computing devices 102 and the server 104 of FIG. 1. For illustration purposes, the computing device 1000 is illustrated in FIG. 10 as implementing the server 104 of FIG. 1.

The computing device 1000 may include one or more processors 1002 (e.g., CPU, GPU, or the like), a memory 1004, communication interfaces 1006, a display device 1008, other input/output (I/O) devices 1010 (e.g., keyboard, trackball, and the like), the sensors 206, and one or more mass storage devices 1012 (e.g., disk drive, solid state disk drive, or the like), configured to communicate with each other, such as via one or more system buses 1014 or other suitable connections. While a single system bus 1014 is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1002 are one or more hardware devices that may include a single processing unit or a number of processing units, all of which may include single or multiple computing units or multiple cores. The processors 1002 may include a graphics processing unit (GPU) that is integrated into the CPU or the GPU may be a separate processor device from the CPU. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein and may be any type of non-transitory media capable of storing computer-readable, processor-executable program instructions as computer program code that can be executed by the processors 1002 as a particular machine configured for carrying out the operations and functions described in the implementations herein.

The computing device 1000 may include one or more communication interfaces 1006 for exchanging data via the network 106. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

The display device 1008 may be used for displaying content (e.g., information and images) to users. Other I/O devices 1010 may be devices that receive various inputs from a user and provide various outputs to the user, and may include a keyboard, a touchpad, a mouse, a printer, audio input/output devices, and so forth.

The computer storage media, such as memory 116 and mass storage devices 1012, may be used to store software and data. For example, the computer storage media may be used to store the software package 118, the machine learning module 120, the risk score 122, the deployment strategies 124, the device data 134 received from the computing devices 102, the variables 140, the stability index 142, and the stability index table 146.

The systems and techniques may determine a stability index associated with a software update after the software update has been provided to multiple computing devices. The software update may include a software application update, a driver update, a firmware update, a basic input output system (BIOS) update, a software patch, another type of software update, or any combination thereof.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, by a server, telemetry data from a computing device;
   determining, by the server and based at least in part on the telemetry data, a device configuration associated with the computing device;
   determining, by the server and based at least in part on the telemetry data, one or more events associated with installing a software package on the computing device;
   determining, by the server executing a machine learning module that is trained using training data that includes success rates of the software package determined during testing and verification of the software package, a stability index associated with the software package based at least in part on the one or more events, wherein the stability index indicates a probability that an error does not occur after the software package is installed on one or more additional computing devices having a similar device configuration to the device configuration associated with the computing device, the probability determined based at least in part on a risk score that is scaled from a low risk to a high risk that installation of the software package causes the error;
   associating, by the server, the stability index with the device configuration;
   determining, by the server, that the stability index satisfies a predetermined threshold; and
   providing, by the server, the software package and the stability index for download to the one or more additional computing devices.

2. The method of claim 1, wherein determining, by the server and based at least in part on the telemetry data, the device configuration associated with the computing device comprises:
   determining, based at least in part on the telemetry data, an identifier associated with the computing device, the identifier comprising one of a service tag or a serial number; and
   determining, based at least in part on the identifier, a hardware configuration associated with the computing device, the hardware configuration comprising: a processor identifier, a processor speed, a graphics processor identifier, an amount of random access memory, a type of a hard drive, and a capacity of the hard drive.

3. The method of claim 1, wherein the stability index is determined based at least in part on: a type of each event of the one or more events, a weight assigned to each type of event, a number of events that have occurred, a number of times the software package was installed, and a scaling factor.

4. The method of claim 1, wherein the one or more events associated with installing the software package on the computing device further comprise at least one of:
an installation log;
a memory dump;
a crash associated with the software package;
an involuntary restart of an operating system installed on the computing device;
a stop error; or
an indication that a user of the computing device initiated contact with a support staff member associated with a manufacturer of the computing device.

5. The method of claim 1, wherein the risk score is determined based on a plurality of predictor variables comprising at least two of: a size of the software package, an average time to install the software package, a reboot indicator indicating whether installation of the software package requires a reboot, and an upgrade indicator indicating whether the software package is a first install or an upgrade to a previous install.

6. The method of claim 1, further comprising:
receiving second telemetry data from a second computing device;
determining that the device configuration associated with the computing device is associated with the second computing device;
determining, from the second telemetry data, one or more additional events associated with installing the software package on the second computing device;
recalculating the stability index associated with the software package based at least in part on the one or more additional events to create an updated stability index;
associating the updated stability index with the device configuration;
determining that the updated stability index fails to satisfy the predetermined threshold; and
stopping providing the software package for download.

7. The method of claim 1, wherein the software package comprises at least one of:
a driver associated with a hardware component of the computing device;
a firmware associated with a hardware component of the computing device;
an update to a software application that was previously installed on the computing device;
a new software application to be installed on the computing device; or
a basic input-output system (BIOS) associated with the computing device.

8. A server comprising:
one or more processors; and
one or more non-transitory computer readable media storing instructions executable by the one or more processors to perform operations comprising:
receiving telemetry data from a computing device;
determining, based at least in part on the telemetry data, a device configuration associated with the computing device;
determining, based at least in part on the telemetry data, one or more events associated with installing a software package on the computing device;
determining, using a machine learning module that is trained using training data that includes success rates of the software package determined during testing and verification of the software package, a stability index associated with the software package based at least in part on the one or more events, wherein the stability index indicates a probability that an error does not occur after the software package is installed on one or more additional computing devices having a similar device configuration to the device configuration associated with the computing device, the probability determined based at least in part on a risk score that is scaled from a low risk to a high risk that installation of the software package causes the error;
associating the stability index with the device configuration;
determining that the stability index satisfies a predetermined threshold; and
providing the software package and the stability index for download to the one or more additional computing devices.

9. The server of claim 8, wherein determining, based at least in part on the telemetry data, the device configuration associated with the computing device comprises:
determining, based at least in part on the telemetry data, an identifier associated with the computing device, the identifier comprising one of a service tag or a serial number; and
determining, based at least in part on the identifier, a hardware configuration associated with the computing device, the hardware configuration comprising: a processor identifier, a processor speed, a graphics processor identifier, an amount of random access memory, a type of a hard drive, and a capacity of the hard drive.

10. The server of claim 8, wherein the software package comprises at least one of:
a driver associated with a hardware component of the computing device;
a firmware associated with a hardware component of the computing device;
an update to a software application that was previously installed on the computing device;
a new software application to be installed on the computing device; or
a basic input-output system (BIOS) associated with the computing device.

11. The server of claim 8, wherein the one or more events associated with installing the software package on the computing device further comprise at least one of:
an installation log;
a memory dump;
a crash associated with the software package;
an involuntary restart of an operating system installed on the computing device;
a stop error; or
an indication that a user of the computing device initiated contact with a support staff member associated with a manufacturer of the computing device.

12. The server of claim 8, wherein the stability index is determined based at least in part on: a type of each event of the one or more events, a weight assigned to each type of event, a number of events that have occurred, a number of times the software package was installed, and a scaling factor.

13. The server of claim 8, further comprising:
receiving second telemetry data from a second computing device;
determining that the device configuration associated with the computing device is associated with the second computing device;
determining, from the second telemetry data, one or more additional events associated with installing the software package on the second computing device;
recalculating the stability index associated with the software package based at least in part on the one or more additional events to create an updated stability index;
associating the updated stability index with the device configuration;
determining that the updated stability index fails to satisfy the predetermined threshold; and
stopping providing the software package for download.

14. One or more non-transitory computer readable media storing instructions executable by one or more processors to perform operations comprising:
receiving telemetry data from a computing device;
determining, based at least in part on the telemetry data, a device configuration associated with the computing device;
determining, based at least in part on the telemetry data, one or more events associated with installing a software package on the computing device;
determining, using a machine learning module that is trained using training data that includes success rates of the software package determined during testing and verification of the software package, a stability index associated with the software package, based at least in part on the one or more events, wherein the stability index indicates a probability that an error does not occur after the software package is installed on one or more additional computing devices having a similar device configuration to the device configuration associated with the computing device, the probability determined based at least in part on a risk score that is scaled from a low risk to a high risk that installation of the software package causes the error;
associating the stability index with the device configuration;
determining, that the stability index satisfies a predetermined threshold; and
providing the software package and the stability index for download to the one or more additional computing devices.

15. The one or more non-transitory computer readable media of claim 14, wherein determining, based at least in part on the telemetry data, the device configuration associated with the computing device comprises:
determining, based at least in part on the telemetry data, an identifier associated with the computing device, the identifier comprising one of a service tag or a serial number; and
determining, based at least in part on the identifier, a hardware configuration associated with the computing device, the hardware configuration comprising: a processor identifier, a processor speed, a graphics processor identifier, an amount of random access memory, a type of a hard drive, and a capacity of the hard drive.

16. The one or more non-transitory computer readable media of claim 14, wherein the stability index is determined based at least in part on: a type of each event of the one or more events, a weight assigned to each type of event, a number of events that have occurred, a number of times the software package was installed, and a scaling factor.

17. The one or more non-transitory computer readable media of claim 16, wherein the one or more events associated with installing the software package on the computing device comprise at least one of:
an installation log;
a memory dump;
a crash associated with the software package;
an involuntary restart of an operating system installed on the computing device;
a stop error; or
an indication that a user of the computing device initiated contact with a support staff member associated with a manufacturer of the computing device.

18. The one or more non-transitory computer readable media of claim 14, wherein the risk score is determined based on a plurality of predictor variables comprising at least two of: a size of the software package, an average time to install the software package, a reboot indicator indicating whether installation of the software package requires a reboot, and an upgrade indicator indicating whether the software package is a first install or an upgrade to a previous install.

19. The one or more non-transitory computer readable media of claim 14, further comprising:
receiving second telemetry data from a second computing device;
determining that the device configuration associated with the computing device is associated with the second computing device;
determining, from the second telemetry data, one or more additional events associated with installing the software package on the second computing device;
recalculating the stability index associated with the software package based at least in part on the one or more additional events to create an updated stability index;
associating the updated stability index with the device configuration;
determining that the updated stability index fails to satisfy the predetermined threshold; and
stopping providing the software package for download.

20. The one or more non-transitory computer readable media of claim 14, wherein:
the software package comprises at least one of:
a driver associated with a hardware component of the computing device;
a firmware associated with a hardware component of the computing device;
an update to a software application that was previously installed on the computing device;
a new software application to be installed on the computing device; or
a basic input-output system (BIOS) associated with the computing device.

\* \* \* \* \*